United States Patent [19]

Kurohashi et al.

[11] Patent Number: 5,116,188
[45] Date of Patent: May 26, 1992

[54] VIBRATION SUPPRESSING DEVICE FOR WHEELED CONSTRUCTION EQUIPMENT

[75] Inventors: Michiya Kurohashi, Takasago; Satoru Torii, Kakogawa; Yoichi Kunieda, Akashi, all of Japan

[73] Assignee: Kabushiki Kaisha Kobe Seiko Sho, Kobe, Japan

[21] Appl. No.: 568,613

[22] Filed: Aug. 16, 1990

Related U.S. Application Data

[63] Continuation of Ser. No. 244,672, Sep. 15, 1988, abandoned.

[30] Foreign Application Priority Data

Sep. 16, 1987 [JP] Japan ................... 62-233276
Sep. 16, 1987 [JP] Japan ................... 62-233277

[51] Int. Cl.$^5$ ............... B66C 23/26; A01B 63/111; F16D 31/02
[52] U.S. Cl. .................. 414/719; 60/413; 60/415; 414/685
[58] Field of Search ............. 60/413, 415; 414/685, 414/719

[56] References Cited

U.S. PATENT DOCUMENTS

| | | | |
|---|---|---|---|
| 3,122,246 | 2/1964 | Freedy et al. | 414/719 X |
| 3,779,017 | 12/1973 | Fujisawa et al. | 60/413 |
| 3,814,265 | 6/1974 | Miller | 212/238 X |
| 3,949,892 | 4/1976 | Ohms | 60/413 X |
| 3,971,215 | 7/1976 | Baron et al. | 60/413 X |
| 4,046,270 | 9/1977 | Baron et al. | 60/413 X |
| 4,120,364 | 10/1978 | Wooldridge | |
| 4,142,368 | 3/1979 | Mantegani | 60/413 |
| 4,202,174 | 5/1980 | Grigorenko et al. | 60/413 |
| 4,286,432 | 9/1981 | Burrows et al. | 60/416 X |
| 4,341,149 | 7/1982 | Dezelan | 60/416 X |
| 4,367,673 | 1/1983 | Krueck et al. | 91/437 |
| 4,590,763 | 5/1986 | Augoyard et al. | 60/416 X |
| 4,636,133 | 1/1987 | Hess | 414/719 X |
| 4,674,638 | 6/1987 | Oliphant | 414/719 X |
| 4,706,930 | 11/1987 | Lexen | 60/413 X |
| 4,738,101 | 4/1988 | Kubik | 60/413 |
| 4,761,954 | 8/1988 | Rosman | 60/416 X |
| 4,809,586 | 3/1989 | Gage et al. | 414/685 X |
| 4,953,723 | 9/1990 | Saotome et al. | 60/413 X |

FOREIGN PATENT DOCUMENTS

| | | | |
|---|---|---|---|
| 656756 | 12/1964 | Belgium . | |
| 2619647 | 11/1977 | Fed. Rep. of Germany | 60/413 |
| 2625748 | 12/1977 | Fed. Rep. of Germany | 60/413 |
| 2838940 | 3/1980 | Fed. Rep. of Germany | 60/413 |
| 1383763 | 6/1963 | France . | |
| 2485136 | 12/1981 | France . | |
| 57-94103 | 6/1982 | Japan | 60/418 |
| 61-46702 | 3/1986 | Japan . | |
| 842229 | 7/1981 | U.S.S.R. | 60/413 |
| 883161 | 11/1961 | United Kingdom . | |

*Primary Examiner*—Robert J. Spar
*Assistant Examiner*—Robert S. Katz
*Attorney, Agent, or Firm*—Oblon, Spivak, McClelland, Maier & Neustadt

[57] ABSTRACT

A vibration suppressing device for a wheeled construction equipment having a wheeled chassis, a working device operatively supported on the wheeled chassis, and a hydraulic circuit including hydraulic actuators for operating the working device for up-and-down motion. The vibration suppressing device includes an accumulator filled with a pressurized gas for suppressing vibrations, and a mode changeover valve for connecting the accumulator to the load bearing pressure chambers of the hydraulic actuators in a travelling mode in which the wheeled construction equipment operates for running, and for disconnecting the accumulator from the load bearing pressure chambers of the hydraulic actuators in a working mode in which the wheeled construction equipment operates. When the working device is held at a height in the range of zero to a minimum limit height from the road, the vibration suppressing device meets conditions: $P_G \times V_A^n \leq P_H \times V_F^n$ and $P_G \leq P_H$, where $P_G$ is the pressure of the gas initially sealed in the accumulator, $V_A$ is the capacity of the accumulator, $P_H$ is static holding pressure maintained in the load bearing pressure chambers of the hydraulic actuators in the travelling mode, $V_F$ is volume variation in the load bearing pressure chambers of the hydraulic actuators, and n is a coefficient of adiabatic change.

3 Claims, 8 Drawing Sheets

VIBRATION SUPPRESSING DEVICE FOR WHEELED CONSTRUCTION EQUIPMENT

This application is a continuation of application Ser. No. 07/244,672, filed on Sep. 15, 1988, now abandoned.

BACKGROUND OF THE INVENTION

1. Field of the Invention

The present invention relates to a vibration suppressing device for wheeled construction equipment, for suppressing vibrations of the working device of wheeled construction equipment while the wheeled construction equipment is running.

2. Description of the Prior Art

Japanese Patent Laid-open (Kokai) No. 59-182195 discloses a vibration suppressing device for suppressing vibratory motions of the working device of wheeled construction equipment, in which a spring and a damping mechanism are provided within the piston rod of a hydraulic actuator for operating the boom of a truck crane.

Japanese Patent Laid-open (Kokai) No. 60-119830 discloses a vibration suppressing device including suppressing devices each provided between the boom and arm actuator of a hydraulic shovel loader or between the arm and bucket actuator of a hydraulic shovel loader, in addition to the hydraulic actuators for operating the arms and the bucket.

These known vibration suppressing systems are complicated in construction, expensive, and are more or less unsatisfactory from the practical point of view in performance for suppressing vibrations of the chassis of the wheeled construction equipment.

SUMMARY OF THE INVENTION

The present invention has been made to solve those problems in the conventional vibration suppressing systems for wheeled construction equipment.

Accordingly, it is an object of the present invention to provide a vibration suppressing device for wheeled construction equipment, having a simple construction and which is easy to manufacture, capable of being manufactured at a reduced manufacturing cost, capable of highly effectively suppressing vibrations of the working device of the wheeled construction equipment, capable of remarkably improving the riding comfort of the wheeled construction equipment to reduce the cause of operator's fatigue, capable of surely preventing the working device from hitting the body of the wheeled construction equipment or the road while the wheeled construction equipment is running, and capable of holding the working device at a predetermined safe height for the safe running of the wheeled construction equipment.

To achieve the object of the invention, the present invention provides a vibration suppressing device for a wheeled construction equipment having a wheeled chassis, a working device operatively supported on the wheeled chassis for up-and-down motion, and a hydraulic circuit including hydraulic actuators for operating the working device for up-and-down motion, comprising an accumulator for suppressing vibrations, and a mode changeover valve for connecting the accumulator to the load bearing pressure chambers of the hydraulic actuators in a travelling mode in which the wheeled construction equipment is operated for running without carrying a load and to disconnect the accumulator from the load bearing pressure chambers of the hydraulic actuators in a working mode in which the wheeled construction equipment operates for work, characterized in that, with the working device held at a height in the range of zero to a minimum limit height from a reference plane for running, the vibration suppressing device meets the conditions:

$$P_G \times V_A^n \leqq P_H \times V_F^n$$

$$P_G \leqq P_H$$

where $P_G$ is the pressure of a gas initially sealed in the accumulator, $V_A$ is the capacity of the accumulator, $P_H$ is static holding pressure maintained in the load bearing pressure chambers of the hydraulic actuators in the running mode, $V_F$ is volume variation in the load bearing pressure chambers of the hydraulic actuators, and n is a coefficient of adiabatic change.

The working device is caused to vibrate in vertical direction by vibrations of the wheeled chassis while the wheeled construction equipment is running entailing axial vibratory motion of the piston rods of the hydraulic actuators for operating the working device. The axial vibratory motion of the piston rods is damped by the damping action of the accumulator, and thereby the riding comfort of the wheeled construction equipment is improved remarkably. Furthermore, since the pressure $P_G$ of the gas sealed in the accumulator is determined so as to meet the foregoing conditions, there is no possibility that the working device is caused to lower below the minimum limit height by the vibratory motion of the wheeled construction equipment during running, the working device is restrained surely from hitting the chassis or the road, and hence safe running of the wheeled construction equipment is secured.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described hereinafter with reference to the accompanying drawings, as applied to a wheeled shovel loader, by way of example.

Figure 1:
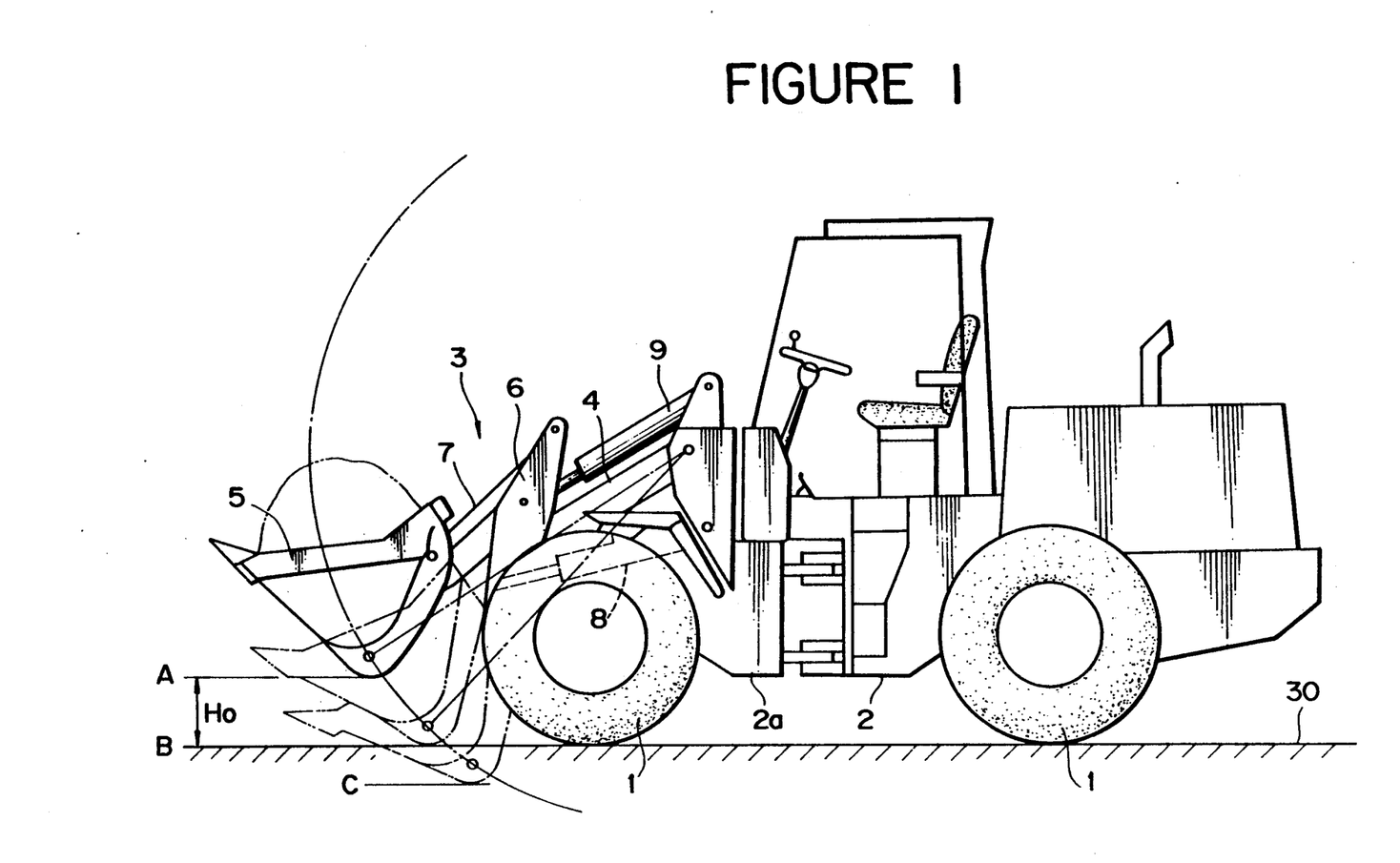
FIG. 1 is a side elevational view of a wheeled construction equipment, namely, a shovel loader, by way of example, to which the present invention is applied.

Referring to FIG. 1 showing a first embodiment, a shovel loader has a chassis 2, four wheels 1 suspended on the chassis 2, and a working device 3 mounted on the front frame 2a of the chassis 2. The working device 3 comprises booms 4 pivotally joined at the base ends thereof to the front frame 2a, a bucket 5 pivotally joined to the free ends of the booms 4, links 6 and 7 linking the bucket 5 to the booms 4, boom actuators (hydraulic actuators) 8 each having one end joined to the front frame 2a and the other end joined to the boom 4, and bucket actuators 9 (hydraulic actuators) each having one end joined to the front frame 2a and the other end joined to the link 6.

This shovel loader is equipped with a vibration suppressing device 20 in a first embodiment according to the present invention for suppressing the vibrations of the working device 3 resulting from the vibrations of the chassis 2 caused by the undulation of the road during travelling without a load or by acceleration or deceleration.

Figure 2:
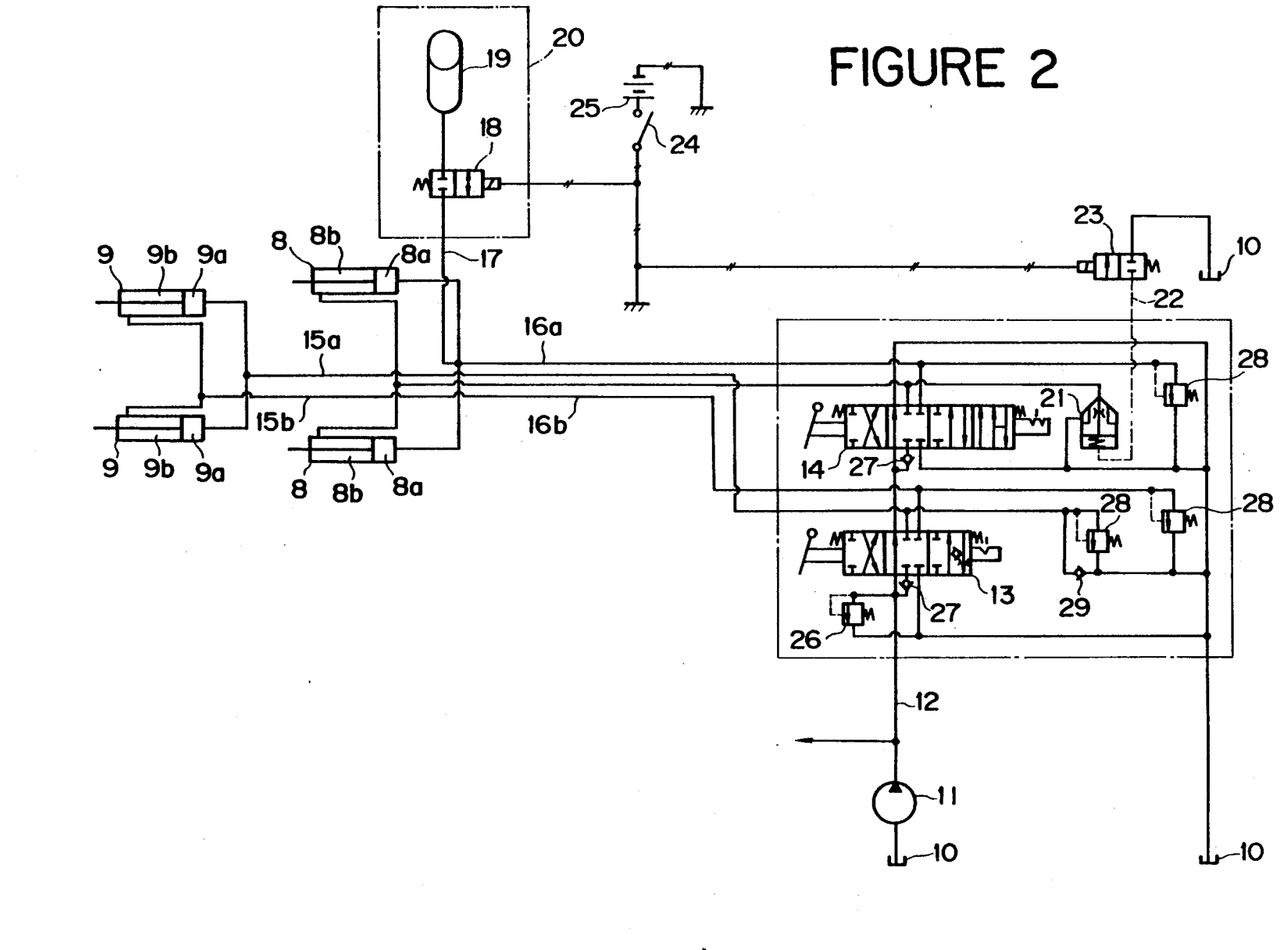
FIG. 2 is a hydraulic circuit digram showing a hydraulic circuit including a vibration suppressing device in a first embodiment according to the present invention.

The shovel loader is provided with a hydraulic circuit shown in FIG. 2 incorporating the vibration suppressing device 20. The hydraulic circuit comprises a tank 10, a pressure pump 11, a first directional control valve 13 for controlling the bucket 5, connected by a supply line 12 to the pressure pump 11, a second directional control valve 14 for controlling the booms 4, connected to the pressure pump 11 by the supply line 12, the bucket actuators 9 each having a head-side pressure chamber 9a and a rod-side pressure chamber 9b connected to the first directional control valve 13 respectively by lines 15a and 15b, the boom actuators 8 each having a head-side pressure chamber (load bearing pressure chamber) 8a and a rod-side pressure chamber 8b connected to the second directional control valve 14 respectively by lines 16a and 16b, and the vibration suppressing device 20.

The vibration suppressing device 20 comprises a mode changeover valve 18 (two-port two-position control valve) connected by a branch line 17 to the line 16a connected to the head-side pressure chambers 8a of the boom actuators 8, and an accumulator 19 connected to the mode changeover valve 18. In a working mode, namely, an operating mode of the shovel loader for construction work such as excavation, the mode changeover valve 18 disconnects the accumulator 19 from the line 16a and, in a travelling mode, namely, an operating mode of the shovel loader for travelling without a load, connects the accumulator 19 to the line 16a. The vibration suppressing device 20 is connected to the head-side pressure chambers 8a of the boom actuators 8 and to the second directional control valve 14 by piping including the lines 16a and 17 and is disposed on the front frame 2a at an optional position so that the same will not interfere with the swing motion of the booms 4 and the operation of the boom actuators 8. The vibration suppressing device 20 may be provided on the cylinder of the boom actuator 8. The accumulator 19 is of a bladder type, a piston type or a diaphragm type.

A vent unloading valve 21 is connected to the line 16b connected to the rod-side pressure chambers 8a of the boom actuator 8. The vent unloading valve 21 is connected also to an auxiliary mode changeover valve 23 (two-port two-position control valve) by a vent line 22. The auxiliary mode changeover valve 23 connects the vent unloading valve 21 to the tank 10 in the running mode and disconnects the same from the tank 10 in the working mode.

The mode changeover valves 18 and 23 are solenoid valves, which are connected electrically to a mode changeover switch 24 and are operated by the mode changeover switch 24 between a working-mode position (disconnecting position) for disconnecting the accumulator 19 and the vent unloading valve 21 from the tank 10 in the working mode and a travelling-mode position (connecting position) for connecting the same to the tank 10 in the travelling mode. The mode changeover switch 24 may be interlocked with a running lever, not shown, for switching operation simultaneous with the operation of the travelling lever according to the operating mode of the shovel loader. The mode changeover valves 18 and 23 may be substituted by hydraulically controlled valves. Indicated at 25 is a power source such as a battery, at 26 is a main relief valve, at 27 are load check valves, at 28 are overload relief valves.

While the shovel loader is working, for example, for excavation, the mode changeover switch 24 is thrown to a working-mode position (opened) to hold the mode changeover valve 18 and the auxiliary mode changeover valve 23 in the working-mode position as shown in FIG. 2. In this state, the second directional control valve 14 for the boom actuators 8 are operated to supply the hydraulic fluid discharged by the pressure pump 11 to the head-side pressure chambers 8a or rod-side pressure chambers 8b of the boom actuators 8 to turn the booms 4 to raise or lower the bucket 5 by projecting or contracting the rods of the boom actuators 8, and the first directional control valve 13 for the bucket actuators 9 is operated to supply the hydraulic fluid discharged by the pressure pump 11 to the head-side pressure chambers 9a or rod-side pressure chambers 9b of the bucket actuators 9 to tip the bucket 5 by projecting or retracting the rods of the bucket actuators 9. Thus, the shovel loader scoops up loose material and discharges it.

Sometimes, a high line pressure is applied to the head-side pressure chambers 8a of the boom actuators 8 during excavation. However, the high line pressure is never applied to the accumulator 19 so as to damage the accumulator 19, because the mode changeover valve 18 is set in the working-mode position. In the working mode, the auxiliary mode changeover valve 23 also is set in the working position (disconnecting position) as shown in FIG. 2 to disconnect the vent line 22 from the tank 10, so that the hydraulic fluid supplied to the rod-side pressure chambers $8b$ of the boom actuators 8 are unable to flow directly into the tank 10 through the vent unloading valve 21. Thus, the hydraulic fluid is supplied smoothly to the rod-side chambers $8b$ of the boom actuators 8 to control the boom actuators 8 properly to achieve work such as excavation.

In the travelling mode, the bucket 5 is raised without a load to a predetermined height, the first and second directional control valves 13 and 14 are held in the neutral position as shown in FIG. 2 to block the lines $15a$ and $15b$ connected to the bucket actuators 9, and the lines $16a$ and $16b$ connected to the boom actuators 8, the mode changeover switch 24 is thrown to the running-mode position (closed), the mode changeover valve 18 and the auxiliary mode changeover valve 23 are set in the travelling-mode position, and then the wheels 1 are driven by an engine for travelling.

When the shovel loader runs on an undulatory road, the chassis 2 is caused to shake due to the undulations of the road or by acceleration or deceleration causing the working device 3 so as to cause the booms 4 holding the working device 3 to swing up and down, and the piston rods of the boom actuators 8 to project and retract accordingly. In such a travelling state, since the mode changeover valve 18 is set in the travelling-mode position to connect the head-side pressure chambers $8a$ of the boom actuators 8 to the accumulator 19, the hydraulic fluid filling the head-side pressure chambers $8a$ of the boom actuators 8 is allowed to flow through the mode changeover valve 18 into the accumulator 19 as the piston rods of the boom actuators 8 retract and the hydraulic fluid is allowed to flow out from the accumulator 19 as the piston rods of the boom actuators 8 project. Then, the axial vibration of the piston rods of the boom actuators 8 is attenuated gradually by the shock absorbing action of the pressurized gas contained in the accumulator 19 and pressure loss attributable to the restrictive action (vibration damping action) of the branch line 17 and the mode changeover valve 18, and thereby the vibration of the working device 3 and the up-and-down swing motion of the booms 4 are suppressed. Furthermore, since the auxiliary mode changeover valve 23 also is set in the travelling-mode position to connect the vent unloading valve 21 through the vent line 22 to the tank 10 while the shovel loader is running, the hydraulic fluid is able to flow into or flow out from the rod-side pressure chambers $8b$ of the boom actuators 8 even if the volumes of the rod-side pressure chambers $8b$ change according to the small axial movement of the piston rods of the boom actuators 8. Accordingly, the appropriate vibration suppressing function of the accumulator 19 is exerted continuously even if the shovel loader operates continuously in the running mode for an extended period of time.

The vibration suppressing device prevents the lower surface of the working device 3, namely, the bottom of the bucket 5, from hitting the road surface 30 even if the chassis 2 is caused to shake greatly by large undulations of the road surface 30.

In the running mode, the bucket 5 is required to be held so that the bottom thereof is positioned at a minimum limit height $H_0$ (FIG. 1) or above from the road surface 30 in conformity with a relevant regulation prescribing security standards for traffic and vehicles. Supposing that positions A, B and C are the positions of the bottom of the bucket 5 where the bottom of the bucket 5 is at a minimum limit height $H_0$, the bottom of the bucket is on the road surface 30, and the bottom of the bucket 5 is at the lowermost position to which the bucket 5 can mechanically be lowered, respectively. It is possible to prevent the bottom of the bucket 5 from hitting the road surface 30 while the shovel loader is travelling with the bucket 5 is raised to the position A, if the movement of the bucket 5 is controlled so that bucket 5 will not move below the position B.

Figure 3:
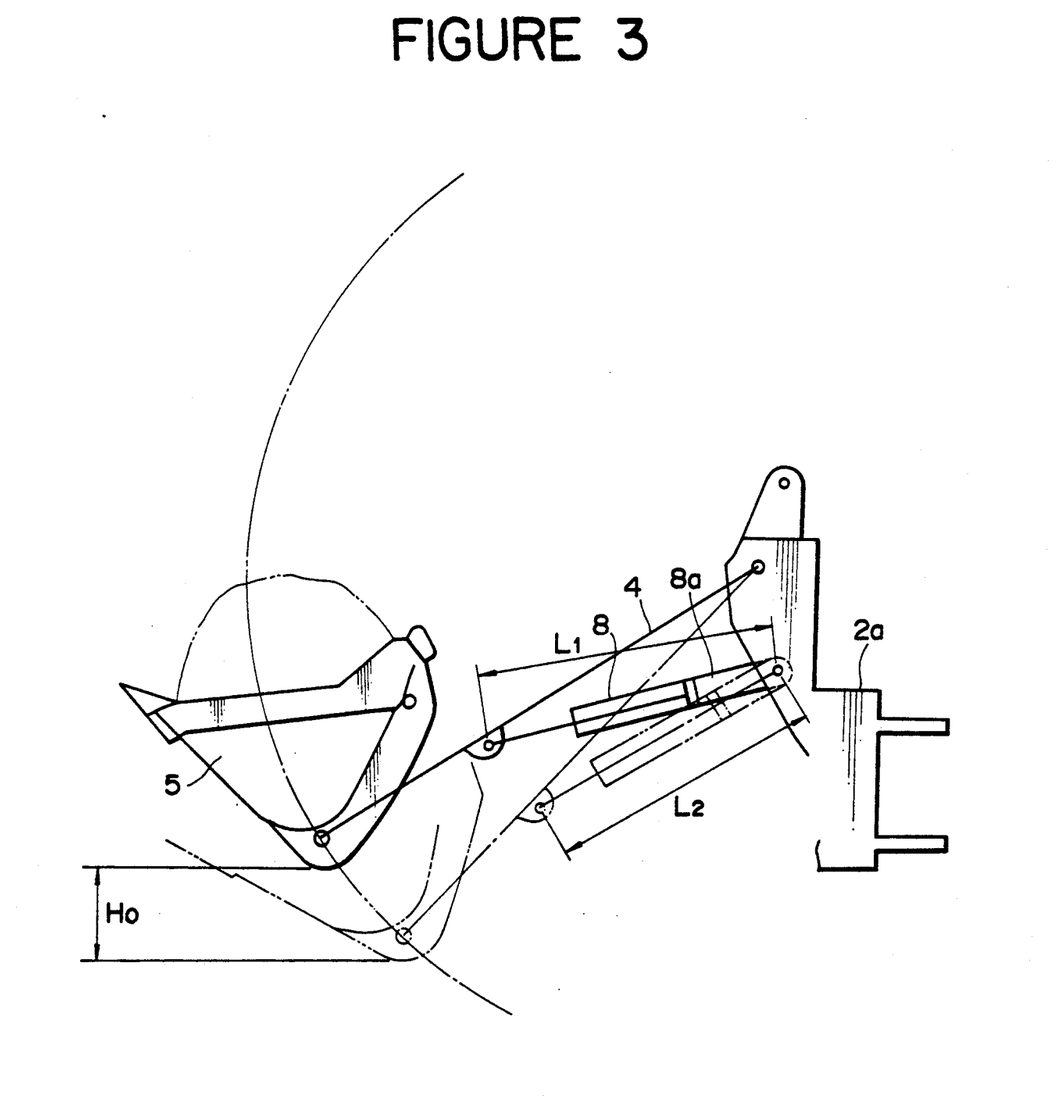
FIG. 3 is a diagrammatic illustration of assistance in explaining the positional variation of the working device of the wheeled construction equipment of FIG. 1.

Referring to FIG. 3, volume variation $V_F$ in the head-side pressure chambers $8a$ of the boom actuators 8 attributable to the movement of the bucket 5 from the position A to the position B is expressed by $$V_F = \pi D^2 (L_1 - L_2) N / 4 \tag{1}$$

where D is the inside diameter of the head-side pressure chambers $8a$ of the boom actuators 8, $L_1$ is the length of the head-side pressure chambers $8a$ when the bucket 5 is at the position A, $L_2$ is the length of the head-side pressure chambers $8a$ when the bucket 5 is at the position B, and N is the number of the boom actuators 8 (ordinarily, two).

While the shovel loader is travelling, the hydraulic fluid of a quantity corresponding to a volume variation in the head-side pressure chambers $8a$ of the boom actuators 8 flows into or flows out from the head-side pressure chambers $8a$, and thereby the hydraulic fluid of the same quantity is urged to flow out or to flow into the accumulator 19 as the bucket 5 moves up or down, respectively.

However, the quantity of the hydraulic fluid allowed to flow into or to flow out from the accumulator 19 is dependent on the volume of the gas $a$ in the accumulator 19, which in turn is dependent on the capacity $V_A$ of the accumulator 19, the initial pressure $P_G$ of the gas, and the static pressure $P_H$ in the head-side pressure chamber $8a$ of the boom actuators 8. The relation between those factors are expressed by $$P_G \times V_A^n = P_H \times a^n \tag{2}$$

where n is a polytropic coefficient. In this case, the volume variation of the gas is assumed to be an adiabatic change, and hence n is assumed to be 1.41.

Accordingly, the bucket 5 held at the position A can be prevented from lowering below the position B to hit the road surface 30 in the travelling mode, when the volume $a$ of the gas in the accumulator 19 is smaller than the volume variation $V_F$ in the head-side pressure chambers $8a$ of the boom actuators 8. That is, $$a \leq V_F \tag{3}$$

From the expressions (2) and (3), $$P_G \times V_A^n \leq P_H \times V_F^n \tag{4}$$

Since it is desirable from the viewpoint of vibration suppression that the initial gas pressure $P_G$ in the accumulator 19 is lower than the static holding pressure $P_H$ in the head-side pressure chambers $8a$ of the boom actuators 8, $$P_G \leq P_H \tag{5}$$

Thus, the bucket 5 can be prevented from hitting the road surface 30 and excellent vibration suppressing performance of the vibration suppressing device is secured by selectively determining the capacity $V_A$ of the accumulator 19 and the initial gas pressure $P_G$ so as to meet the expressions (4) and (5).

Figure 4:
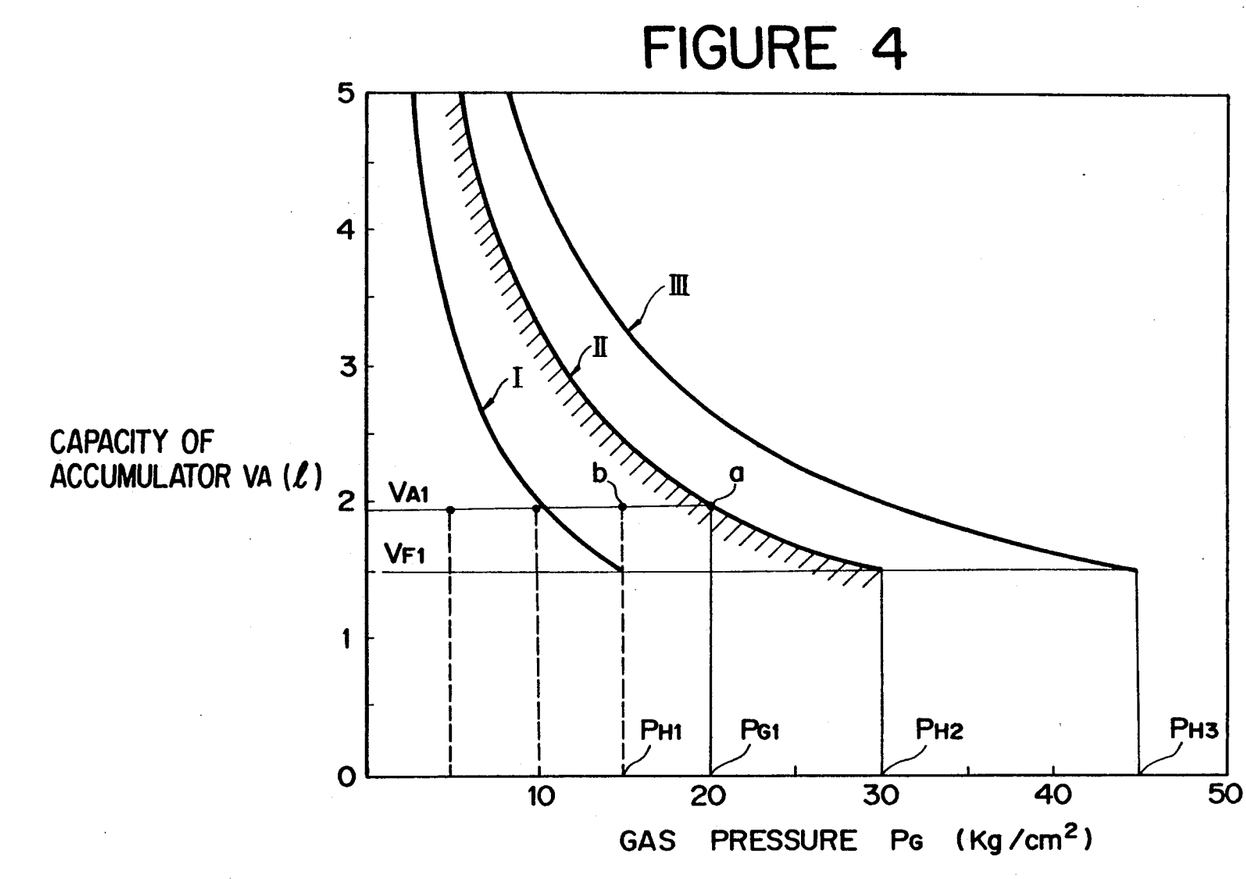
FIG. 4 is a graph showing the relation between the capacity of an accumulator and the pressure of a gas sealed in the accumulator.

FIG. 4 is a graph showing plots of the capacity $V_A$ of the accumulator 19 vs. the initial gas pressure $P_G$ for the static holding pressure $P_H$ calculated by using the expression (4), in which the volume variation $V_F$ in the head-side pressure chambers 8a of the boom actuators 8 is $V_{F1} = 1.5$ l, and curves I, II and III are respectively for static holding pressures $P_{H1}$, $P_{H2}$ and $P_{H3}$.

Figure 5:
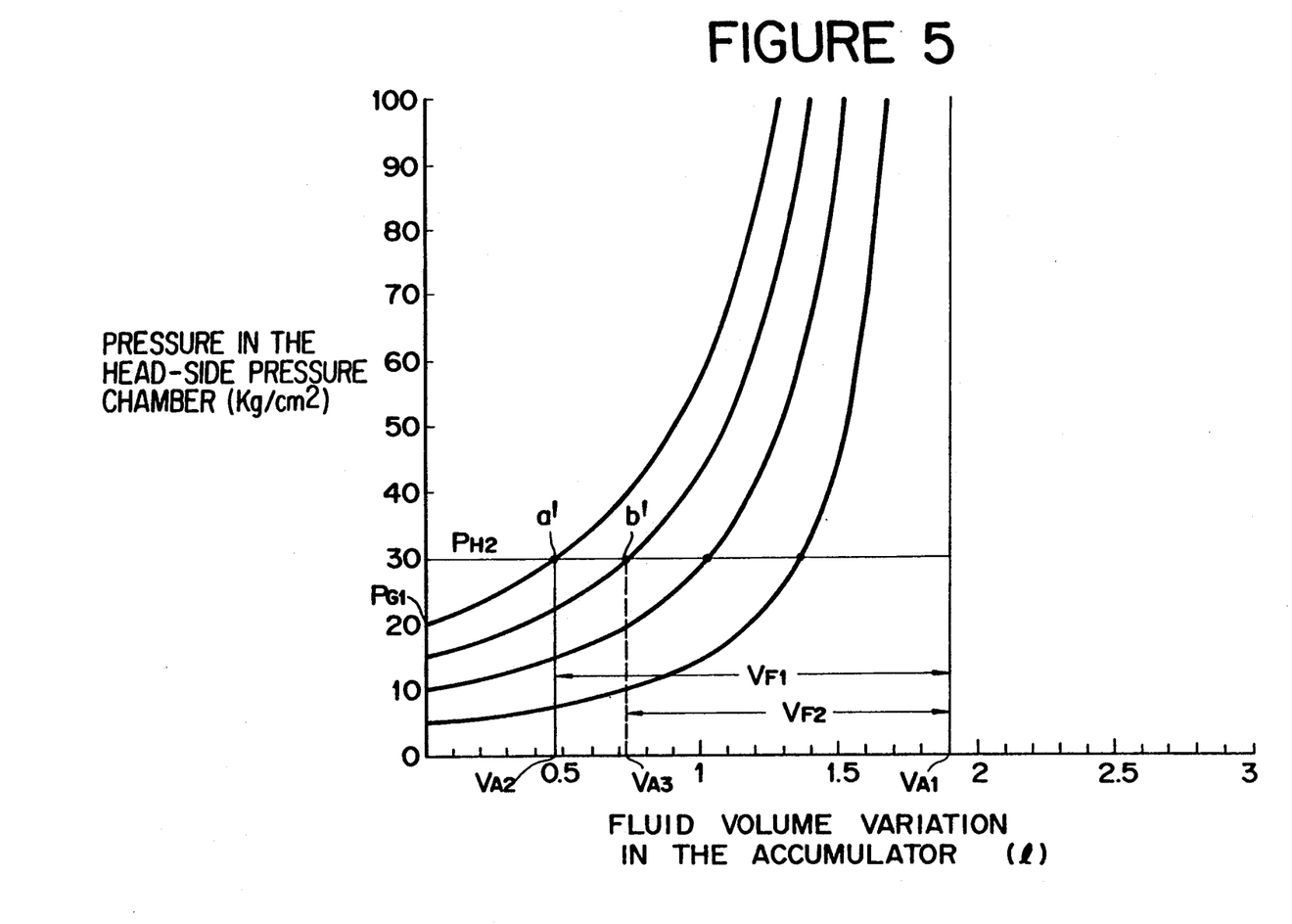
FIG. 5 is a graph showing the variation of the quantity of hydraulic fluid flowing into the accumulator with the pressure in the load bearing pressure chamber of a hydraulic actuator.

Referring to FIG. 4, when the static holding pressure $P_H = P_{H2} = 30$ kg/cm$^2$, the shaded area satisfied the expression (4). For example, a point a on the curve II indicates that, when the static holding pressure $P_H = P_{H2} = 30$ kg/cm$^2$, and the capacity $V_A = V_{A1} = 1.9$ l, a maximum initial gas pressure $P_G = P_{G1} = 20$ kg/cm$^2$. Practically, the capacity $V_{A1}$ of the accumulator 19 is reduced to a capacity $V_{A2}$ as shown in FIG. 5. In this state, the difference between $V_{A1}$ and $V_{A2}$ corresponds to the volume variation $V_{F1}$ in the head-side pressure chambers 8a of the boom actuators 8.

Similarly, point b in the shaded area in FIG. 4 indicates that the capacity $V_A = V_{A1}$, and the initial gas pressure $P_G$ is less than the initial gas pressure $P_{G1}$. In this case, the gas pressure $P_G$ coincides with the static holding pressure $P_{H2}$ at point b' in FIG. 5, and a volume variation $V_{F2}$ corresponding to the difference between the capacities $V_{A1}$ and $V_{A3}$ is smaller than the volume variation $V_{F1}$. Conditions represented by the point b in FIG. 4 satisfies the expression (4) and is safer than those represented by the point a in FIG. 4. Similar conditions can be established by fixing the gas pressure $P_G$ and reducing the capacity $V_A$ of the accumulator 19.

A modification of the first embodiment employs a check valve for cavitation prevention instead of the vent unloading valve 21, an auxiliary mode changeover valve similar to the auxiliary mode changeover valve 23, provided in the line 16b connected to the rod-side pressure chambers 8b of the boom actuators 8, to connect the rod-side pressure chambers 8b of the boom actuators 8 directly to or to disconnect the same from the tank 10, and a slow-return check valve placed between the mode changeover valve 18 and the accumulator 19, for positive vibration attenuation in addition to the passive vibration attenuation by the pressure loss in the branch line 17 and the mode changeover valve 18.

Figure 6:
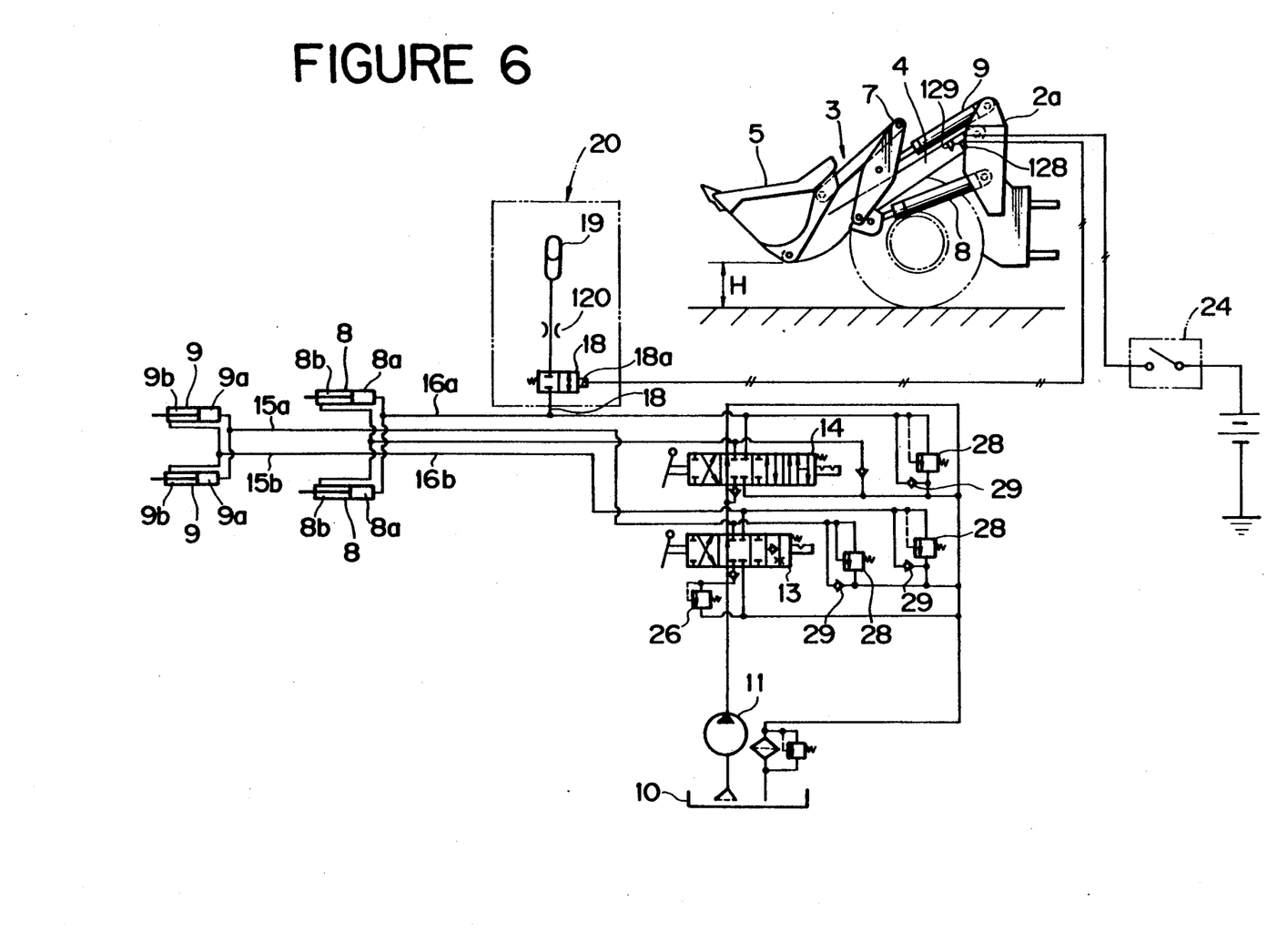
FIG. 6 is a hydraulic circuit diagram showing a hydraulic circuit including a vibration suppressing device in a second embodiment according to the present invention.
Figure 7:
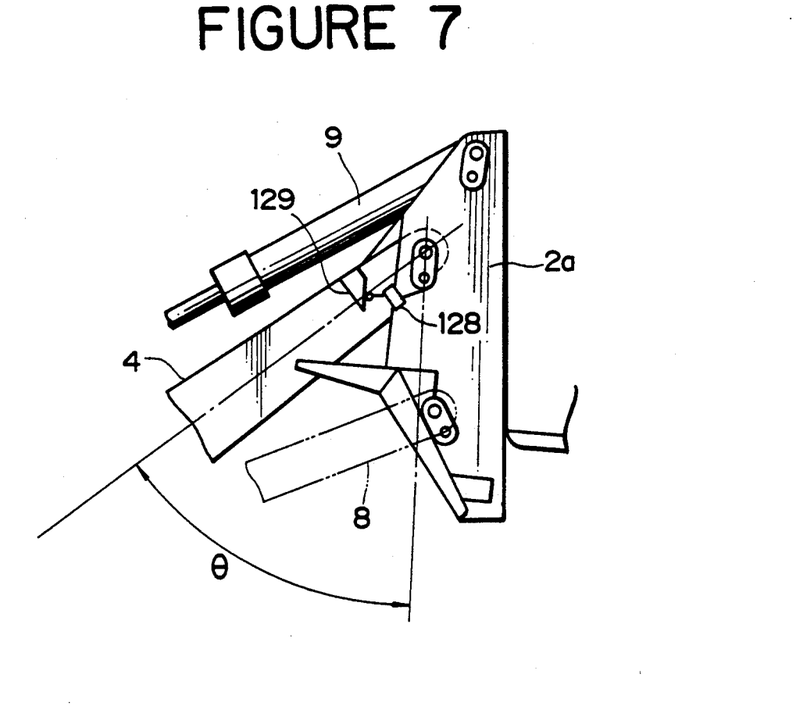
FIG. 7 is an enlarged fragmentary side elevation of a shovel loader into which the vibration suppressing device of FIG. 6 is incorporated.

The vibration suppressing device in a second embodiment according to the present invention as shown in FIGS. 6 and 7 will be described hereinafter as applied to the same shovel loader as shown in FIG. 1, in which parts like or corresponding to those previously described with reference to the first embodiment will be denoted by the same reference numerals and the description thereof will be omitted.

The second embodiment is substantially the same as the first embodiment in constitution, except that a vibration suppressing device 20 in the second embodiment comprises a mode changeover valve 18 (a two-port two-position solenoid valve), an accumulator 19, and a restrictor 120 provided in a line interconnecting the mode changeover valve 18 and the accumulator 19.

In the working mode, the mode changeover valve 18 is set in a disconnecting position as shown in FIG. 6 to disconnect the accumulator 19 from the line 16a connected to the head-side pressure chambers 8a of the boom actuators 8. Then, the second directional control valve 14 is operated to supply the hydraulic fluid to the head-side pressure chambers 8a or rod-side pressure chambers 8b of the boom actuators 8 to turn the booms 4 upward or downward. The first directional control valve 13 is operated to supply the hydraulic fluid to the head-side pressure chambers 9a or rod-side pressure chambers 9b of the bucket actuators 9 to scoop or dump material. Since the accumulator 19 is disconnected from the line 16a by the mode changeover valve 18, the accumulator 19 is never damaged even if the high-pressure hydraulic fluid is supplied through the line 16a to the head-side pressure chambers 8a of the boom actuators 8.

In the travelling mode, the first directional control valve 13 and the second directional control valve 14 are set in the neutral position as shown in FIG. 6, and the mode changeover valve 18 is set in the travelling-mode position (connecting position). In the travelling mode, the bucket 5 is held at a predetermined height from the road surface in a maximum upward tilted position.

The principle and functions of vibration suppression of the second embodiment is substantially the same as those of the first embodiment. The vibration suppressing device 20 of the second embodiment suppresses the vibratory variation of the pressure of the hydraulic fluid in the line 16a more positively by the function of the restrictor 120 in addition to the combined effect of the shock absorbing function of the accumulator 19 and the vibration attenuating effect of pressure loss in the mode changeover valve 18. The shovel loader is considered to be a dynamic vibration device consisting of a primary vibration device, namely, the chassis 2 having a larger weight (mass), and a secondary vibration device, namely, the working device 3 having a smaller weight (mass). The capacity of the accumulator 19 and the pressure of the gas sealed in the accumulator 19 are determined selectively so that the natural frequency of the secondary vibration device is substantially the same as that of the primary vibration device.

In changing the operating mode of the shovel loader from the working mode to the running mode, the bucket 5 is placed at a lower position (ordinarily, a position at a height H on the order of 10 cm from the road surface) for safe travelling, and then the mode changeover valve is set in the travelling-mode position. However, it occurs in setting the mode changeover valve in the travelling-mode position that the bucket 5 has an abrupt descent, because a portion of the hydraulic fluid filling the line 16a and the head-side pressure chambers 8a of the boom actuators 8 flows into the accumulator 19 upon the connection of the accumulator 19 to the line 16a. The greater the weight of the bucket 5, the greater is the drop of the bucket 5. Accordingly, it is possible that the bucket 5 drops on the road in changing the working mode for the travelling mode, when the height H is not sufficiently large. It is also possible that the bucket 5 is caused to descend to the road surface by the intense vibrations of the chassis 2 of the shovel loader during running.

The vibration suppressing device in the second embodiment is provided for such accidental descent of the bucket 5. As best shown in FIG. 7, a normally-closed limit switch 128 is attached to the front frame 2a of the chassis 2 and is connected in series to the mode changeover switch 24, and an actuating cam 129 is attached to the base end of the boom 4. The actuator cam 129 opens the limit switch 128 when the inclination $\theta$ of the boom 4 decreases below a predetermined minimum inclination $\theta_1$, namely, when the height H of the bucket 5 decreases below a predetermined minimum height $H_0$. The electromagnetic operator 18a of the mode changeover valve 18 can be actuated for setting the mode changeover valve 18 in the travelling-mode position only when both the mode changeover switch 24 and the limit switch 128 are closed.

When the height H of the bucket 5 decreases below the limit height $H_0$ in changing the working mode for the travelling mode or in the running mode, the limit switch 128 is opened to hold the mode changeover valve 18 in the working-mode position, and hence the travelling mode cannot be established even if the mode changeover switch 24 is closed or the travelling mode is cancelled while the shovel loader is operating in the travelling mode to prevent the drop of the bucket 5 on the road in changing the working mode for the travelling mode or in the travelling mode, so that safe travelling of the shovel loader is secured.

It is desirable to change the limit height $H_0$ for the bucket 5, hence the limit inclination $\theta_0$ for the booms 4, depending on the conditions of the road and the weight of the load. Therefore, it is desirable that the position of the limit switch 128 or the actuating cam 129 is adjustable.

Thus, since the mode changeover valve is set in the working-mode position to disconnect the vibration suppressing device 20 from the line 16a in case the height of the bucket 5 decreases beyond the predetermined limit height in changing the working mode for the travelling mode and while the shovel loader is travelling, accidental dropping of the bucket 5 on the road is prevented.

In modifications, the restrictor 120 of the vibration suppressing device 20 may be substituted by a slow-return valve consisting of a restrictor and a check valve; the vibration suppressing device 20 may be provided with no restricting means and provided with a pipe capable of causing pressure loss for interconnecting the accumulator 19 and the mode changeover valve 18; the limit switch 128 may be substituted by a magnetic sensor or a photoelectric sensor; or the vibration suppressing device 20 may be connected directly to the head-side pressure chambers 8a of the boom actuators 8.

Figure 8:
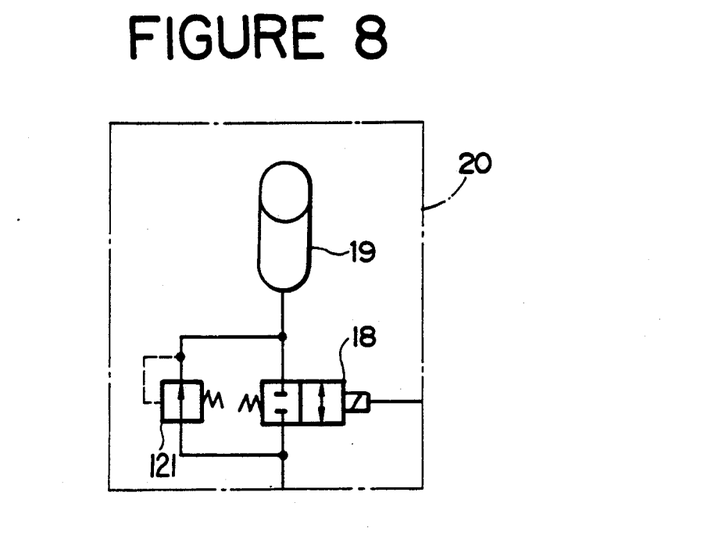
FIG. 8 is a hydraulic circuit diagram of a vibration suppressing device in a third embodiment according to the present invention.

A vibration suppressing device in a third embodiment according to the present invention and as shown in FIG. 8 will be described hereinafter as applied to the same wheeled shovel loader as that shown in FIG. 1, in which parts like or corresponding to those previously described with reference to the foregoing embodiments will be denoted by the same reference numerals and the description thereof will be omitted.

The vibration suppressing device in the third embodiment is substantially the same as the foregoing embodiments in constitution and principle, except that a vibration suppressing device 20 employed in the third embodiment comprises an accumulator 19 for suppressing vibrations, a mode changeover valve (two-port two-position valve) 18 provided in the branch line 17 connecting the accumulator 19 to the line 16a connected to the head-side pressure chambers 8a of the boom actuators 8, and a pressure reducing valve 121 connected to the branch line 17 in parallel to the mode changeover valve 18. The primary port of the pressure reducing valve 121 is connected through the branch line 17 to the line 16a while the secondary port of the same is connected through the branch line 17 to the accumulator 19. The pressure reducing valve 121 is set for a set pressure equal to the holding pressure of the head-side pressure chambers 8a of the boom actuators 8. The vibration suppressing device 20 may be disposed at any suitable position on the chassis 2 of the shovel loader or on the boom actuator 8. The operating principle and functions of the vibration suppressing device 20 are substantially the same as those of the vibration suppressing device 20 of the foregoing embodiments, except that the accumulator 19 of the third embodiment is connected always to the line 16a through the pressure reducing valve 121.

In the working mode, the mode changeover switch 24 is thrown to the working-mode position (OFF position) to set both the mode changeover valve 18 and the auxiliary mode changeover valve 23 in the working-mode position (disconnecting position). In this state, the accumulator 19 communicates with the head-side pressure chambers 8a of the boom actuators 8 through the pressure reducing valve 121, the branch line 17 and the line 16a. Although the high-pressure hydraulic fluid is supplied to and discharged from the boom actuators 8 and the bucket actuators 9 through the lines 16a, 16b, 15a and 15b to swing the booms 4 in vertical directions and to tip the bucket 5 under the control of the first directional control valve 13 and the second directional control valve 14, which are operated by the operator, the high pressure is not applied to the accumulator 19 because the pressure reducing valve 121 is set for the holding pressure lower than the high pressure for operating the boom actuators 8 and the bucket actuators 9, and hence the accumulator 9 will never be damaged. Furthermore, in the working mode, since the vent line 22 is blocked by the auxiliary mode changeover valve 23, the high-pressure hydraulic fluid flowing through the line 16b connected to the rod-side pressure chambers 8b of the boom actuators 8 is unable to be discharged directly into the tank 10, and hence the high-pressure hydraulic fluid is supplied smoothly into and discharged smoothly from the rod-side pressure chambers 8b of the boom actuators 8, so that the boom actuators 8 are controlled properly.

On the other hand, when the second directional control valve 14 is set in the neutral position after the end of the work such as excavation to stop the boom actuators 8 by blocking the lines 16a and 16b connected to the boom actuators 8, the pressure of the accumulator 19 is maintained at a pressure equal to the holding pressure of the boom actuators 8. Accordingly, the booms 4 are not allowed to turn abruptly downward and hence the bucket 5 does not have an abrupt descent when the mode changeover valve 18 is set in the travelling-mode position to connect the accumulator 19 to the head-side pressure chambers 8a of the boom actuators 8 after raising the bucket 5 to the predetermined safety height, and thereby the bucket 5 is held at the safety height during running.

Figure 9:
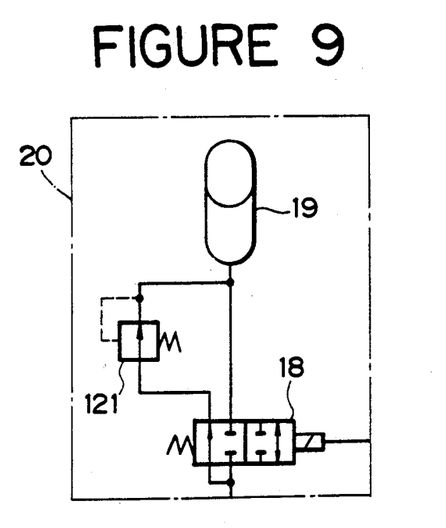
FIG. 9 is a hydraulic circuit diagram of a vibration suppressing device in a fourth embodiment according to the present invention.

A vibration suppressing device in a fourth embodiment according to the present invention as shown in FIG. 9 will be described hereinafter as applied to the same wheeled shovel loader as shown in FIG. 1, in which parts like or corresponding to those described with reference to the foregoing embodiments are denoted by the same reference numerals and the description thereof will be omitted.

The vibration suppressing device in the fourth embodiment is substantially the same as the vibration suppressing device in the third embodiment in constitution and functions, except that the vibration suppressing device in the fourth embodiment employs a vibration suppressing device 20 comprising an accumulator 19, a mode changeover valve (four-port two-position valve) 18 provided in a branch line 17 connecting the accumulator to the line 16a connected to the head-side pressure chambers 8a of the boom actuators 8, and a pressure reducing valve 121 having a primary port connected to one of the outlet ports of the mode changeover valve 18 and a secondary port connected to the accumulator 19.

When the mode changeover valve 18 is set in the working-mode position, the accumulator 19 communicates with the head-side pressure chambers 8a of the boom actuators 8 through the pressure reducing valve 121 and the mode changeover valve 18. When the mode changeover valve 18 is set in the travelling-mode position, the accumulator 19 communicates with the head-side pressure chambers 8a of the boom actuators 8 directly through the mode changeover valve 18. Thus, the pressure of the accumulator 19 is maintained always at a pressure equal to the holding pressure to prevent the abrupt dropping of the bucket 5 in changing the working mode for the running mode.

Figure 10:
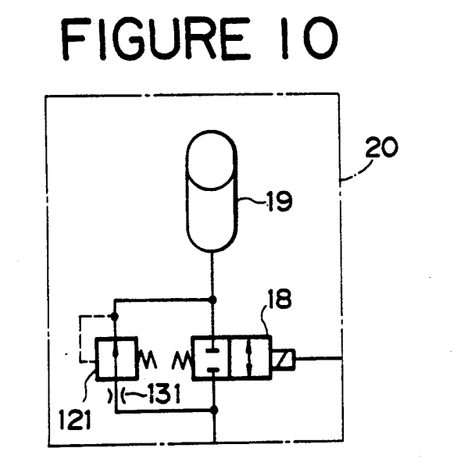
FIG. 10 is a hydraulic circuit diagram of a vibration suppressing device in a fifth embodiment according to the present invention.

A vibration suppressing device in a fifth embodiment according to the present invention as shown in FIG. 10 will be described hereinafter as applied to the same wheeled shovel loader as shown in FIG. 1, in which parts like or corresponding to those previously described with reference to the foregoing embodiments are denoted by the same reference numerals and the description thereof will be omitted.

The vibration suppressing device in the fifth embodiment is substantially the same as the foregoing embodiments in constitution and functions, except that the vibration suppressing device in the fifth embodiment employs a vibration suppressing device 20 comprising an accumulator 19, a mode changeover valve 18 (two-port two-position valve) provided in a branch line 17 connecting the accumulator 19 to the line 16a connected to the head-side pressure chambers 8a of the boom actuators 8, a pressure reducing valve 121 connected to the branch line 17 in parallel to the mode changeover valve 18, and a restrictor 131 provided in a line connecting the primary port of the pressure reducing valve 121 to the branch line 17 and connected to the primary port of the pressure reducing valve 121.

This vibration suppressing device 20 exerts, in addition to the effects of the foregoing embodiments, an effect of suppressing the abrupt flow of the high-pressure hydraulic fluid into the accumulator 19. Even if the pressure stored in the accumulator 19 has dropped below the set pressure of the pressure reducing valve 121 and the pressure of the hydraulic fluid supplied to the head-side pressure chambers 8a of the boom actuators has increased beyond the set pressure of the pressure reducing valve 121 in the working mode, the restrictor 131 restricts the abrupt flow of the high-pressure hydraulic fluid into the vibration suppressing device 20 and enables the pressure of the accumulator 19 to increase gradually to the set pressure corresponding to the holding pressure. Accordingly, the hydraulic fluid is never discharged abruptly from the head-side pressure chambers 8a of the boom actuators 8, and thereby the sudden downward swing of the booms 4 is prevented, which improves the safety of the shovel loader.

Figure 11:
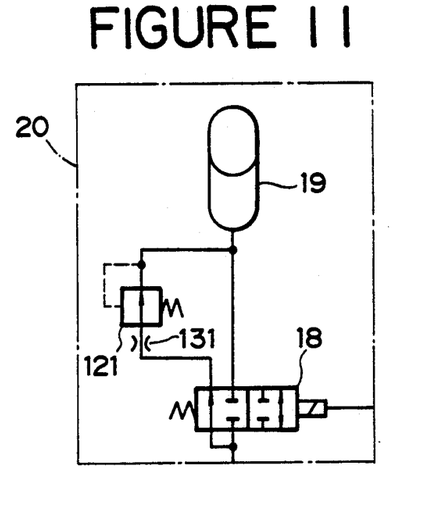
FIG. 11 is a hydraulic circuit diagram of a vibration suppressing device in a sixth embodiment according to the present invention.

A vibration suppressing device in a sixth embodiment according to the present invention as shown in FIG. 11 will be described hereinafter as applied to the same wheeled shovel loader as shown in FIG. 1, in which parts like or corresponding to those previously described with reference to the foregoing embodiments are denoted by the same reference numerals and the description thereof will be omitted.

The vibration suppressing device in the sixth embodiment is substantially the same as those in the fourth and fifth embodiments in constitution and functions, except that this vibration suppressing device employs a vibration suppressing device 20 capable of exerting, in combination, the respective effects of the vibration suppressing devices 20 of the fourth and fifth embodiments. This vibration suppressing device 20 comprises an accumulator 19, a mode changeover valve 18, namely, a two-port two-position valve the same as that employed in the vibration suppressing device 20 of the fourth embodiment, provided in a branch line 17 connecting the accumulator 19 to the line 16a connected to the head-side pressure chambers 8a of the boom actuators 8, a pressure reducing valve 121 the same as those of the vibration suppressing devices 20 of the fourth and fifth embodiments, and a restrictor 131 capable of the same function as that of the restrictor 131 of the fifth embodiment.

Although the present invention has been described as applied to a wheeled shovel loader, the present invention is not limited thereto in its application, but may be applied to other wheeled construction equipments such as wheeled power shovels, truck cranes, tractor dozers, and the like.

As is apparent from the foregoing description, according to the present invention, the capacity and the gas pressure of the accumulator of the vibration suppressing device is determined selectively so as to satisfy the conditions stated hereinbefore for effectively suppressing the vibrations of the working device of the wheeled construction equipment and for effectively preventing the working device of the wheeled construction equipment from hitting the body or chassis of the wheeled construction equipment and the road, so that the present invention ensures the safe travelling of the wheeled construction equipment and remarkably improves the riding comfort of the wheeled construction equipment.

Furthermore, the accumulator of the vibration suppressing device is protected from damage from the high-pressure hydraulic fluid supplied to the actuators of the wheeled construction equipment in the working mode, which improves the mechanical life of the vibration suppressing device.

Still further, the vibration suppressing device of the present invention is simple in construction, capable of being manufactured at a reduced cost, and is capable of simply being incorporated into the existing hydraulic circuit of a wheeled construction equipment.

Moreover, the vibration suppressing device is capable of inhibiting the abrupt drop of the working device attributable to the abrupt flow of the hydraulic fluid from the load bearing pressure chambers of the actuators into the accumulator of the vibration suppressing device in changing the working mode for the travelling mode, which further improves the safety of the wheeled construction equipment.

Although the invention has been described in its preferred forms with a certain degree of particularity, it is obvious to those skilled in the art that many variations and changes are possible therein. It is therefore to be understood that the present invention may be applied otherwise than specifically described herein without departing from the scope and spirit thereof.

What is claimed as new and desired to be secured by Letters Patent of the United States is:

1. A vibration suppressing device for wheeled construction equipment travelling on a road having a wheeled chassis, a working device operatively supported on the wheeled chassis for vertical motion, and a hydraulic circuit including a plurality of hydraulic actuators for moving the working device in a vertical direction, comprising:

an accumulator for suppression of vibrations, filled with a pressurized gas;

a mode changeover valve for connecting the accumulator to the load bearing pressure chambers of the hydraulic actuators in a travelling mode in which the wheeled construction equipment is travelling on said road and for disconnecting the accumulator from the load bearing pressure chambers of the hydraulic actuators in a working mode in which the working device of the wheeled construction equipment is operated;

means for maintaining the position of said working device over a predetermined minimum limit height from said road for travelling, wherein said vibration suppressing device is so designed as to meet the following conditions for preventing said working device from contacting said road when said working device thus positioned is bounced during travelling and which includes means for limiting the quantity of hydraulic fluids allowed to flow into or out of the accumulator according to the relationship:

$$P_G \times V_A^n \leq P_H \times V_F^n$$

$$P_G \leq P_H$$

where $P_G$ is the pressure of a gas initially sealed in the accumulator, $V_A$ is the volumetric capacity of the accumulator, $P_H$ is static holding pressure maintained in the load bearing pressure chambers of the hydraulic actuators in the travelling mode, $V_F$ is volume variation in the load bearing pressure chambers of the hydraulic actuators, and n is the coefficient of adiabatic change of the gas;

an auxiliary mode changeover valve for controlling pressure to rod side chambers of the hydraulic actuators; and a changeover switch for controlling operation of both said mode changeover valve and said auxiliary mode changeover valve.

2. A vibration suppressing device according to claim 1, which comprises a control circuit for controlling on-off operation of said mode changeover valve and which includes height detecting means for detecting the height of the working device from the road, and which provides a signal to shift said mode changeover valve to a disconnecting position when the height of the working device is smaller than said predetermined height.

3. A vibration suppressing device according to claim 1, wherein said accumulator is connected to the load bearing pressure chambers of the hydraulic actuators by a pipe resistive to the flow of hydraulic fluid.

* * * * *